United States Patent
Yamada et al.

(10) Patent No.: US 7,853,776 B2
(45) Date of Patent: Dec. 14, 2010

(54) HANDOVER BETWEEN SOFTWARE AND HARDWARE ACCELERATOR

(75) Inventors: Tetsuya Yamada, Sagamihara (JP); Naohiko Irie, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 1071 days.

(21) Appl. No.: 11/260,423

(22) Filed: Oct. 28, 2005

(65) Prior Publication Data

US 2006/0101427 A1 May 11, 2006

(30) Foreign Application Priority Data

Oct. 29, 2004  (JP) ............................. 2004-315099

(51) Int. Cl.
*G06F 9/30* (2006.01)
(52) U.S. Cl. .................... 712/209; 717/136; 712/43
(58) Field of Classification Search ............... 717/136; 712/209, E9.035, 43

See application file for complete search history.

(56) References Cited

U.S. PATENT DOCUMENTS

| | | | | |
|---|---|---|---|---|
| 6,021,469 | A * | 2/2000 | Tremblay et al. | 711/125 |
| 6,332,215 | B1 | 12/2001 | Patel et al. | |
| 7,047,394 | B1 * | 5/2006 | Van Dyke et al. | 712/209 |
| 7,080,362 | B2 * | 7/2006 | Patel et al. | 717/139 |
| 7,124,283 | B2 * | 10/2006 | Yamada et al. | 712/209 |
| 7,434,030 | B2 * | 10/2008 | Irie et al. | 712/209 |
| 2002/0069402 | A1 * | 6/2002 | Nevill et al. | 717/139 |
| 2002/0099930 | A1 * | 7/2002 | Sakamoto et al. | 712/227 |
| 2002/0184479 | A1 * | 12/2002 | Sexton et al. | 712/236 |
| 2002/0199087 | A1 * | 12/2002 | Seal et al. | 712/227 |
| 2003/0023958 | A1 * | 1/2003 | Patel et al. | 717/146 |
| 2004/0003204 | A1 | 1/2004 | Yamada et al. | |
| 2004/0031022 | A1 * | 2/2004 | Kabasawa et al. | 717/139 |
| 2004/0049658 | A1 * | 3/2004 | Kabasawa et al. | 712/209 |
| 2004/0153630 | A1 * | 8/2004 | Henry et al. | 712/209 |
| 2004/0215444 | A1 * | 10/2004 | Patel et al. | 704/2 |
| 2004/0236927 | A1 * | 11/2004 | Irie et al. | 712/209 |
| 2005/0027965 | A1 * | 2/2005 | Yamada et al. | 712/34 |

FOREIGN PATENT DOCUMENTS

| | | |
|---|---|---|
| JP | 7-319830 A | 12/1995 |
| JP | 11-224199 A | 8/1999 |
| JP | 2004-30222 | 1/2004 |
| JP | 2004-102375 A | 4/2004 |

* cited by examiner

*Primary Examiner*—Eddie P Chan
*Assistant Examiner*—Idriss N Alrobaye
(74) *Attorney, Agent, or Firm*—Mattingly & Malur, P.C.

(57) ABSTRACT

A bytecode accelerator which translates stack-based intermediate language (bytecodes) into register-based CPU instructions transfers plural pieces of internal information from a register file of a CPU to the bytecode accelerator by means of an internal transfer bus between the bytecode accelerator and the CPU and an input selection logic of the bytecode accelerator when the bytecode accelerator is started and transfers plural pieces of internal information in the bytecode accelerator to the register file of the CPU by means of the internal transfer bus, an output selector and an output selector selection logic of the bytecode accelerator when the bytecode accelerator ends its operation in transition between hardware processing and software processing by software virtual machine.

5 Claims, 6 Drawing Sheets

| Counter | Instruction: | |
|---|---|---|
| 4 | LOAD | #TARGET, R0 |
| 3 | JMP | @R0 |
| 2 | STC | BCA, R1;Operand Output |
| 1 | STC | BCA, R2;Statectl Output |
| 0 | STC | BCA, R3;Event Counter Output |

```
Counter    Instruction:
   2       JMP    @Rn        ;Jump Java Program
   1       LDC    R1, BCA    ;Statectl Input
   0       LDC    R2, BCA    ;Event Counter Input
```

HANDOVER BETWEEN SOFTWARE AND HARDWARE ACCELERATOR

INCORPORATION BY REFERENCE

The present application claims priority from Japanese application JP2004-315099 filed on Oct. 29, 2004, the content of which is hereby incorporated by reference into this application.

BACKGROUND OF THE INVENTION

The present invention relates to an information processor such as a microprocessor which can translate instructions in an intermediate language into native instructions to be executed and more particularly to a technique effectively applicable to a microprocessor which includes a hardware accelerator for translating an intermediate language such as bytecodes into instructions specific to a microprocessor.

Recently, Java™ which can operate in a variety of apparatuses independently of particular hardware and platform such as operating system (OS) is widespread from large servers to portable telephones. Java is an object-oriented programming language similar to C++ developed by Sun Microsystems and "Java" is a registered trademark of Sun Microsystems.

Java is translated from source codes into an intermediate language named bytecodes that are independent of platform at the time of compiling. The bytecodes are interpreted into native codes specific to a microprocessor by means of software named a Java virtual machine (JVM) to be executed. By providing the Java virtual machine corresponding to a platform, difference in the platform is absorbed by the Java virtual machine.

Execution of the bytecodes by the Java virtual machine is slow since processing is made while the bytecodes are interpreted one by one by the interpreter system. The use of operand stacks in the interpreter system is inefficient due to multi-direction branch processing by bytecodes and one-by-one interpretation. Accordingly, in order to reduce the overhead caused by the interpretation processing, translation of bytecodes used frequently into native codes is performed by hardware (bytecode accelerator) to thereby attain high-speed operation. For example, U.S. Pat. No. 6,332,215 discloses hardware for translating bytecodes into native codes of a microprocessor. Complicated bytecodes used with low frequency are processed by means of the Java virtual machine of software.

JP-A-2004-30222 discloses that attention is paid to high-speed transition time between the hardware processing and the software Java virtual machine and when bytecodes cannot be translated into native codes by a bytecode accelerator, a dedicated bus is used to transfer data for internal information between registers of hardware accelerator and a register file of CPU when a translation operation mode is switched to the mode using the software Java virtual machine. In the case to the contrary, the internal information is transferred from the register file of CPU to the registers of the hardware accelerator.

SUMMARY OF THE INVENTION

In a real application, bytecodes processed by hardware processing and software are mixed and hardware processing and software processing are sometimes switched with high frequency. Accordingly, it is important to shorten the switching time between the hardware processing and the software processing. Since delivery of information is made between hardware and software Java virtual machine upon transition of processing, the delivery of information can be made at high speed by devising sharing of resources between hardware and software Java virtual machine. Sharing of data by an external memory, a cache memory or general registers is considered in delivery of information but sharing of data by general registers is made at highest speed.

In JP-A-2004-30222, as described above, the dedicated bus is used to transfer data between the hardware and the register file upon switching of translation modes and data sharing by registers is performed. However, JP-A-2004-30222 does not consider or describe the technical item about selection of internal information to be transferred by means of the dedicated bus. Since data on the dedicated bus is fixed upon switching of modes, data to be transferred is limited to one data. In order to attain operation at higher speed, it is necessary to perform data sharing by registers between hardware processing and software Java virtual machine. In order to realize this data sharing, another mechanism for transferring plural data by means of the dedicated bus is required.

It is an object of the present invention to switch hardware processing and software processing at high speed.

The above and other objects and novel features of the present invention will be apparent from the following description of the specification taken in connection with the accompanying drawings.

The summary of typical aspects of the present invention disclosed in the present application is described below in brief.

[1] According to the present invention, the information processor comprises a register file including a plurality of registers, an instruction execution unit utilizing the register file to execute first format instructions as native instructions and an instruction translation circuit for translating second format instructions into the first format instructions. The information processor has, when a first program described in the second format instructions is executed, a first operation mode in which the first format instructions translated by the instruction translation circuit are executed and a second operation mode in which the first format instructions translated by translation software described in the first format instructions are executed and further comprises a dedicated bus (22) for transferring data between the register file and the instruction translation circuit. The instruction translation circuit includes a selection control circuit (23, 24, 28) which selectively outputs plural pieces of internal information onto the dedicated bus in response to execution of instructions by the instruction execution unit to allow to be stored in the register file when the operation mode is switched from the first operation mode to the second operation mode and controls to take in the internal information outputted from the register file onto the dedicated bus in response to execution of instructions by the instruction execution unit when the operation mode is switched from the second operation mode to the first operation mode.

According to the present invention described above, when the operation mode is switched, the internal information can be selected to be transferred onto the dedicated bus. The plural pieces of internal information can be shared by hardware processing and software processing through the register file. The switching between the hardware processing and the software processing can be made at high speed.

According to a concrete aspect of the present invention, the internal information includes register management information for utilizing the plurality of registers as stacks and event count information for switching events. Further, the internal information outputted onto the dedicated bus at the time that the operation mode is switched from the first operation mode to the second operation mode is an operand taken out from the second format instruction. Further, when it is supposed that the second format instruction is, for example, the bytecode in Java, the operand of the bytecode accompanies the bytecode and accordingly the operand is stored in the instruction cache memory. On the other hand, the operand of the native code that is the first format instruction is stored in the data cache memory and accordingly when the bytecode taken in the instruction translation circuit is the unsupported bytecode (that is the bytecode untranslatable by the instruction translation circuit), the operation mode is switched from the first operation mode to the second operation mode and the bytecode must be translated and executed. When the instruction execution unit executes the instruction translated in the second operation mode, the instruction execution unit must get the necessary operand by data access. At this time, since the operand already taken in the instruction translation circuit has been previously transferred internally to the register file via the dedicated bus, it is not necessary to access the external memory due to the data cache miss even if the data cache memory does not hold the necessary operand and accordingly processing is not delayed due to the penalty of the data cache miss.

According to a further concrete aspect of the present invention, the selection control circuit includes a selector (23) for selecting the internal information outputted onto the dedicated bus, an output selection logic circuit (24) for controlling selection operation of the selector in response to execution of instructions by the instruction execution unit when the operation mode is switched from the first operation mode to the second operation mode and an input selection logic circuit (28) for controlling to select a delivery destination of the internal information outputted onto the dedicated bus in response to execution of instructions when the operation mode is switched from the second operation mode to the first operation mode.

The selection control circuit includes a simulated pipeline which simulates a pipeline of the instruction execution unit and generates timing that the internal information is outputted onto the dedicated bus in synchronism with a predetermined pipeline stage in the simulated pipeline and timing that the internal information on the dedicated bus is taken in. Outputting of the internal information onto the dedicated bus can be easily synchronized with taking in of the internal information on the dedicated bus.

According to a concrete aspect of the present invention, referring to the outputting the internal information onto the dedicated bus and the timing of taking in the internal information on the dedicated bus, when the operation mode is switched from the first operation mode to the second operation mode, the translation circuit causes the instruction execution unit to execute a plurality of store instructions and the selection control circuit selectively outputs the plural pieces of internal information onto the dedicated bus in response to execution of the store instructions. When the operation mode is switched from the second operation mode to the first operation mode, the translation circuit causes the instruction execution unit to execute a plurality of load instructions and the selection control circuit controls to take in the internal information outputted onto the dedicated bus from the register file in response to execution of the load instruction.

[2] According to another aspect of the present invention, the information processor comprises a register file including a plurality of registers, an instruction execution unit utilizing the register file to execute first format instructions as native instructions and an instruction translation circuit for translating second format instructions into the first format instructions. The information processor has, when a first program described in the second format instructions is executed, a first operation mode in which the first format instructions translated by the instruction translation circuit are executed and a second operation mode in which the first format instructions translated by translation software described in the first format instructions are executed. Further, the information processor comprises a dedicated bus for transferring data between the registers and the instruction translation circuit. The instruction translation circuit includes a selection control circuit which outputs register management information onto the dedicated bus in response to execution of instructions by the instruction execution unit to allow to be stored in the register file when the operation mode is switched from the first operation mode to the second operation mode and controls to take in the register management information outputted from the register file onto the dedicated bus in response to execution of instructions by the instruction execution unit when the operation mode is switched from the second operation mode to the first operation mode.

According to a concrete aspect of the present invention, the first format instructions are register-based instructions and the second format instruction are stack-based instructions. At this time, the register management information is information relating to assignment of stacks for utilizing the plurality of registers as stacks.

[3] According to still another aspect of the present invention, the information processor comprises a register file having a plurality of registers, an instruction execution unit utilizing the register file to execute first format instructions as native instructions and an instruction translation circuit for translating second format instructions into the first format instructions. The information processor has, when a first program described in the second format instructions is executed, a first operation mode in which the first format instructions translated by the instruction translation circuit are executed and a second operation mode in which the first format instructions translated by translation software described in the first format instructions are executed. Further, the information processor comprises a dedicated bus for transferring data between the registers and the instruction translation circuit. The instruction translation circuit includes a selection control circuit which outputs event count information for switching events onto the dedicated bus in response to execution of instructions by the instruction execution unit to allow to be stored in the register file when the operation mode is switched from the first operation mode to the second operation mode and controls to take in the event count information outputted from the register file onto the dedicated bus in response to execution of instructions by the instruction execution unit when the operation mode is switched from the second operation mode to the first operation mode.

According to a concrete aspect of the present invention, the selection control circuit further outputs an operand taken out from the second format instruction onto the dedicated bus to allow to be stored in the register file when the operation mode is switched from the first operation mode to the second operation mode.

[4] According to a still another aspect of the present invention, the information processor comprises a plurality of registers, an instruction execution unit utilizing the plurality of registers to execute first format instructions as native instructions and an instruction translation circuit for translating second format instructions into the first format instructions. The information processor has, when a first program described in the second format instructions is executed, a first operation mode in which the first format instructions translated by the instruction translation circuit are executed and a second operation mode in which the first format instructions translated by translation software described in the first format instructions are executed. Further, the information processor comprises a dedicated bus for transferring data between the registers and the instruction translation circuit. The instruction translation circuit performs data transfer between the plurality of registers and the instruction translation circuit by means of the dedicated bus in parallel with switching of the operation mode between the first and second operation modes and synchronizes timing of the data transfer with plural times of register store operation by the instruction execution unit to change data in a transfer source for each of instructions prescribing the register store operation.

According to a still another aspect of the present invention, a portable information system comprises an antenna, a first information processing unit for coding signals obtained from the antenna, a first main memory connected to the first information processing unit, a second information processing unit including a plurality of registers, an instruction execution unit for executing first format instructions and making register-based processing and an instruction translation circuit, the second information processing unit making it possible to access the first main memory and a second main memory connected to the second information processing unit. The second information processing unit has, when a program described in second format instructions transferred through the antenna to the first main memory is executed, a first operation mode in which the first format instructions translated by the instruction translation circuit are executed and a second operation mode in which the first format instructions translated by translation software described in the first format instructions are executed. The instruction translation circuit performs data transfer between the plurality of registers and the instruction translation circuit by means of the dedicated bus in parallel with switching of the operation mode between the first and second operation modes and synchronizes timing of the data transfer with plural times of register store operation by the instruction execution unit to change data in a transfer source for each of instructions prescribing the register store operation.

Effects attained by typical aspects of the present invention disclosed in the present application are described below in brief.

Switching between the hardware processing and the software processing can be made at high speed.

Other objects, features and advantages of the invention will become apparent from the following description of the embodiments of the invention taken in conjunction with the accompanying drawings.

DETAILED DESCRIPTION OF THE EMBODIMENTS

Figure 1:
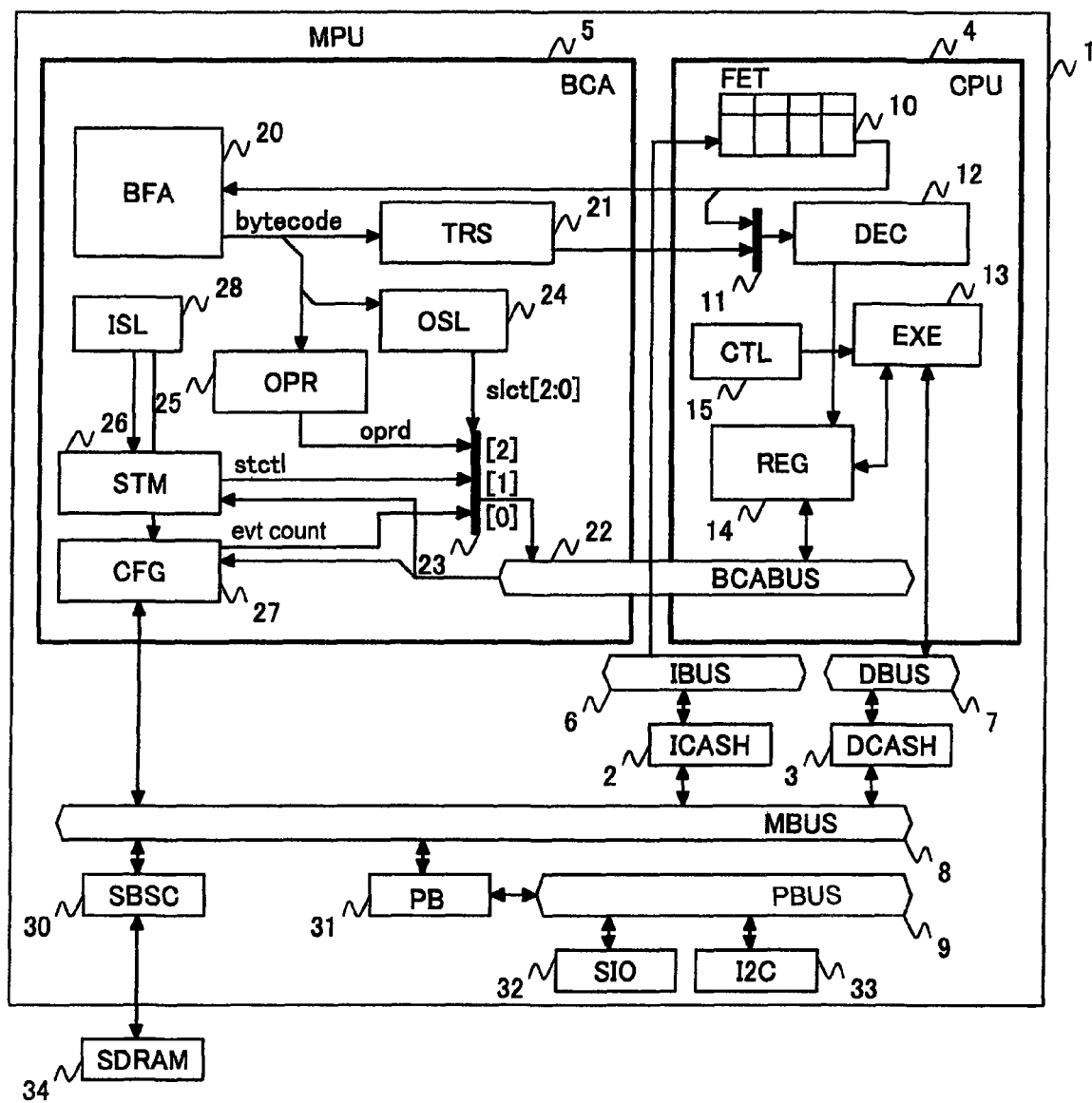
FIG. 1 is a block diagram schematically illustrating a microprocessor according to an embodiment of an information processor of the present invention.

FIG. 1 schematically illustrates a microprocessor according to an embodiment of an information processor of the present invention. The microprocessor (MPU) 1 shown in FIG. 1 is fabricated on a single semiconductor substrate of a monocrystalline silicon by means of the semiconductor integrated circuit technique for fabricating known CMOSs (complementary MOS transistors) and bipolar transistors, although not limited thereto.

The microprocessor 1 includes an instruction cache memory (ICACH) 2, a data cache memory (DCACH) 3, a central processing unit (CPU) 4 serving as a main processor, a bytecode accelerator (BCA) 5, a bus status controller (SBSC) 30 which can be connected to SDRAM, a bus bridge (PB) 31 for peripheral bus, a serial I/O module (SIO) 32 and an I2C controller (I2C) 33 shown representatively. The central processing unit 4 is connected through an instruction bus (IBUS) 6 to the instruction cache memory 2 and through a data bus (DBUS) 7 to the data cache memory 3. The instruction cache memory 2, the data cache memory 3, the bus status controller 30 and the bus bridge 31 are connected to a main internal bus (MBUS) 8. The bus status controller 30 has the interface control function with the SDRAM 34 connected externally. The bus e bridge 31 for peripheral bus has the bus bridge function between the main internal bus 8 and a peripheral bus (PBUS) 9. The peripheral interfaces such as the serial I/O module 32 and the I2C controller 33 are connected to the peripheral bus 9.

The central processing unit 4 includes an instruction fetch unit (FET) 10 which fetches instructions from the instruction cache memory 2, a selector 11 which selects an output of the instruction fetch unit 10 or the bytecode accelerator 5, a decoder (DEC) 12 which decodes an instruction, an execution unit (EXE) 13 which makes operation and execution of instructions on the basis of the decoded result of instructions, a controller (CTL) 15 which generates a control signal and a register file (REG) 14 composed of a plurality of registers.

The bytecode accelerator 5 includes a bytecode fetch unit (BFA) 20, a bytecode translation logic unit (TRS) 21, a transfer bus (BCABUS) 22, an output selector 23, an output selector selection logic (OSL) 24, an input selection logic (ISL) 28, an operand output unit (OPR) 25, an internal status unit (STM) 26 for BCA and a configuration register unit (CFG) 27. The bytecode fetch unit (BFA) 20 takes out bytecodes from instructions outputted from the instruction fetch unit 10 of the CPU 4 and makes a request of instructions. The request of instructions is made in case where, for example, when bytecodes at a branch destination are required, an address of the branch destination is sent to the instruction fetch unit 10 of the CPU 4 to thereby request an instruction containing the bytecodes at the branch destination. The bytecode translation logic unit 21 translates bytecodes into native codes. The transfer bus 22 is a dedicated bus for making transfer of data between the bytecode accelerator 5 and the register file 14 of the CPU 4. The output selector 23 selects data to be outputted onto the transfer bus 22. The output selector 23 is controlled by a control signal produced by the output selector selection logic (OSL) 24. The input selection logic 28 is a logic circuit for producing a control signal for selecting data outputted from the register file 14 of the CPU 4 onto the transfer bus 22 within the bytecode accelerator 5. The input selection circuit 28 controls an input gate or a flip-flop of a memory stage connected to a signal route leading from the transfer bus 22 to the configuration register unit 27 and further controls an input gate or a flip-flop of a memory stage connected to another signal route leading from the transfer bus 22 to the internal status unit 26. The operand output unit 25 outputs an operand of bytecodes. The bytecode has a variable length and the head in which an operation code is set. The bytecodes requiring an operand have bytecodes disposed after the operand. The internal status unit 26 has management information such as stack top, stack bottom and number of effective entries since the internal status unit 26 processes stack-based bytecodes. The configuration register unit 27 stores configuration information of BCA. The configuration register unit 27 is a memory-mapped register and is accessed using the memory access cycle. Although not limited, the register file 14 of the central processing unit 4 has 16 general registers represented by R0 to R15.

The bytecodes mean virtual machine instructions which do not depend on the architecture of the central processing unit 4 and represent, for example, Java bytecodes. The native codes mean the native instructions which depend on the architecture of the central processing unit (CPU) 4. Here, the virtual machine instructions and the native instructions are stored in the instruction cache memory 2. The operand of the bytecode is concomitant with the bytecodes and accordingly stored in the instruction cache memory 2. On the other hand, the operand of the native codes is stored in the data cache memory 3. The bytecodes taken in the bytecode accelerator 5 have an operand and are unsupported bytecodes (which cannot be translated by the bytecode accelerator 5) in some cases. At this time, the bytecode accelerator ends its processing and the bytecodes must be translated by the interpreter of the software virtual machine. When the CPU 4 executes the codes translated by the software virtual machine, the CPU 4 must get a necessary operand, although the necessary operand is sometimes not stored in the data cache memory 3. At this time, it is necessary to access the external memory 34 and accordingly the overhead is increased. In order to get the operand at high speed, when the bytecode accelerator 5 ends its processing, the bytecode accelerator 5 has the mechanism that the operand taken in the bytecode accelerator 5 is internally transferred to the register file 14 through the transfer bus 22 previously. Accordingly, when the bytecodes are translated by the interpreter of the software virtual machine, a value in the register file may be used as the operand. Consequently, since it is not necessary to access the external memory 34 due to the data cache miss, high-speed operation can be realized. Similarly to the internal transfer of the operand, some pieces of internal information can be transferred through the bus 22 from the bytecode accelerator 5 to the CPU 4 and internal information in the CPU 4 can be transferred in the opposite direction. The former transfer is made in parallel when the bytecode accelerator is ended and the latter transfer is made in parallel when the bytecode accelerator is started. The transfer of internal information is described below.

Processing of instructions is first described. The microprocessor 1 processes two instructions including a native instruction specific to the CPU 4 and bytecodes in the intermediate language such as Java. The CPU instruction is fetched by the instruction fetch unit 10 of the CPU 4 and an output of the instruction fetch unit is selected by the selector 11 to be supplied to the decoder 12. The CPU instruction is decoded by the decoder and processed by the execution unit 13. The execution unit 13 makes operation using data obtained from the register file 14 or the data bus 7, loads operation data onto the data bus 7 or writes operation data in the register file 14.

The bytecodes are processed using the CPU 4 and the bytecode accelerator 5. First, the instruction fetch unit 10 of the CPU 4 fetches an instruction from the instruction cache memory 2 or the like. The instruction is supplied to the bytecode fetch unit 20 of the bytecode accelerator 5, so that the instruction is subjected to alignment processing for taking out the bytecodes. The bytecode fetch unit 20 holds the bytecodes and issues a fetch request of bytecodes to the instruction fetch unit 10 of the CPU 4. For example, when the bytecodes at a branch destination is required, the bytecode fetch unit 20 sends an address at the branch destination to the instruction fetch unit 10 of the CPU 4 to request an instruction containing the bytecodes at the branch destination. The aligned bytecodes are translated into one or a plurality of CPU instructions by the bytecode translation logic unit 21 to be supplied to the CPU 4. Then, an output of the bytecode accelerator is selected by the selector 11 to be supplied to the decoder 12. Processing subsequent to the decoder 12 is common to the processing of CPU instruction. The selector 11 is controlled to select an output of the bytecode translation logic unit 21 when the bytecode accelerator 5 is operated and to select an output of the instruction fetch unit 10 when the bytecode accelerator is ended.

Start and stop operation of the bytecode accelerator 5 is now described briefly. A control register (contained in BFA 20) of the bytecode accelerator 5 contains an enable bit of the bytecode accelerator 5. In order to allow the bytecode accelerator 5 to be used, the enable bit in the control register is set. The bytecode accelerator 5 is started in response to detection of a particular CPU instruction (e.g. J_JP instruction) and begins to translate the bytecodes. When the bytecode accelerator 5 is started, the bytecode accelerator 5 sets an address (Java PC) of a Java instruction (bytecode) in a program counter (contained in controller 15) of the CPU 4 and sends internal information such as stack information stored in the general register (e.g. R10) of the CPU 4 through the bus 22 to the STM 26 or CFG 27 of the bytecode accelerator 5 to be set therein. Setting of the address to the program counter is made by taking out the address of Java instruction stored in one general register in the register file 14 and sending the address from the general register through the execution unit 13 and controller 15 to the program counter PC to be set therein. In parallel with this setting operation, internal information such as stack information stored in the general register of the register file 14 is sent through the data transfer bus 22 to the STM 26 or CFG 27 of the bytecode accelerator BCA to be set therein. Transfer operation of the internal information is described later in detail.

Further, when the bytecode accelerator 5 ends its operation, that is, when the bytecode accelerator 5 starts the software virtual machine, the bytecode accelerator 5 makes operation of setting the CPU instruction address of the software virtual machine in the program counter of the CPU 4, operation of saving internal information of the bytecode accelerator 5 into the register file 14 or the like of the CPU 4, operation of saving an address (Java PC) of Java bytecodes in the program counter of the CPU 4 into the general register and the like. In order to set the CPU instruction address of the software virtual machine in the program counter of the CPU, the bytecode accelerator 5 translates the CPU instruction into a branch instruction by which relevant operation is made and the relevant instruction is selected by the selector 11 to be sent through the decoder 12 and the controller 15 to the program counter PC and be set therein. In order to save the address (Java PC) of the Java bytecodes of the program counter of the CPU 4, the address may be sent from the Java PC of the program counter through the controller 15 and the execution unit 13 to the general register of the register file 14 to be saved therein. The internal information of the bytecode accelerator 5 may be transferred to the register file 14 through the bus 22. Transfer operation of the internal information is described later in detail. Then, the processing proceeds to software processing using the software virtual machine.

Next, transfer operation of plural data between the bytecode accelerator 5 and the register file 14 is described.

The microprocessor 1 has two statuses including a status of processing the native CPU instruction and a status of processing the bytecodes such as Java by the bytecode accelerator 5. In the bytecode processing using the bytecode accelerator 5, in order to reduce the hardware scale of the bytecode accelerator 5, only frequently used and uncomplicated bytecodes are processed by the bytecode accelerator 5 and complicated bytecodes are processed by software by the software virtual machine. Accordingly, in a real Java application, software processing and hardware processing by the bytecode accelerator 5 are performed mixedly. That is, since two statuses including the status of processing bytecodes by the bytecode accelerator 5 and the status of processing native CPU instruction by the software virtual machine exist mixedly, reduction of the transition time by sharing of resources between two statuses is important in order to attain the Java application processing at high speed.

The sharing of resources is attained by methods using the external memory, the internal cache memory and the registers, while the sharing using the registers is made at highest speed. Since the number of registers is limited, information necessary to attain sharing of resources and having higher priority is set in the registers. Information to be shared can be classified broadly into three kinds as follows.

(1) Internal Status Information of Bytecode Accelerator 5

In the hardware processing using the bytecode accelerator 5, a part of the upper part of the operand stacks of the bytecodes is set in the register file 14 and inter-stack operation is made by inter-register operation, so that high-speed operation is attained. Accordingly, the bytecode accelerator 5 manages stack information set in the register file 14. In exceptional processing such as address translation buffer (TLB) miss and interruption, processing of the bytecode accelerator 5 is ended and the exceptional processing is performed, although it is necessary to transfer stack information required upon return from the bytecode accelerator 5 to the register file 14. The internal information of the bytecode accelerator 5 is contained in this category.

(2) Bytecode Operand Information

The bytecodes have a variable length ranging from one to several bytes. The first bytecode is an operation code and other bytecodes are operands. The bytecodes having one or more operands out of the complicated bytecodes processed by the software virtual machine (named unsupported bytecodes) are necessarily read by the software virtual machine and accordingly when the operand data aligned by the bytecode accelerator 5 is held in the register file 14, it is effective to attain high-speed operation.

(a) When the processing is changed to the processing that a name of a reference address is changed to a real address in the software virtual machine in get field (getfield) bytecode and put field (putfield) bytecode, the operand information is used as a constant pool index.

(b) Bytecodes goto_w and jsr_w are used as a branch offset. It is effective for the cache memory in which instructions and data are separated to set the operand of the bytecodes in the register file 14. The operand of the unsupported bytecodes can be delivered to the register of the register file 14 to thereby eliminate the time of loading the operand information such as index to the data cache 3 from the external memory 34. Since the index is held in the instruction cache memory 2 but not held in the data cache memory 3, the index must be loaded from the external memory 34 to the data cache memory 3. In future, since the access from the external memory 34 has the increased latency as the operation frequency is improved, the high-speed processing operation is expected. Further, the operand can be arranged or aligned to be delivered, so that the number of processing instructions in the software virtual machine can be reduced. This operation corresponds to the operation that information in the external memory 34 is delivered from the bytecode accelerator 5 to the register file 14 of the CPU 4.

(3) Event Count Information

In order to avoid the bytecode accelerator 5 from occupying processing, the software virtual machine is caused to perform some processing at regular intervals and the number of times of execution of particular bytecodes is counted, so that the avoidance of occupancy can be realized by confirming that the count reaches a plural number of times of execution of the particular bytecodes. When all the bytecodes are processed by the interpreter on the software virtual machine, the number of times of execution of the bytecodes may be managed, although when the bytecodes are executed by the bytecode accelerator 5, the number of times of execution of the bytecodes cannot be grasped by the software virtual machine. Accordingly, the bytecode accelerator 5 has the function of counting events. The event counting function includes counting of the number of executed bytecodes and counting of the number of branches in which processing is branched backward. The event counter register is a memory mapped register and can be read or changed by the software virtual machine. Since the event register is the memory mapped register, access thereto is very slow. When execution of the thread is interrupted, the bytecode accelerator 5 uses the value of the event register changed by the software virtual machine. Accordingly, when the event register resides in the register file 14, the high-speed operation can be attained effectively. The event count information is considered as an example of information that can be read or changed like the information in the memory mapped register of the bytecode accelerator 5 but requires a large number of cycles.

The method of transferring the plural data from the bytecode accelerator 5 to the register file 14 of the CPU 4 when the bytecode accelerator 5 ends its operation is described below.

(1) The bytecode operand information (oprd) is outputted from the operand output unit 25.

(2) The internal status information (stctl) of the bytecode accelerator 5 is outputted from the internal status unit 26.

(3) The event count information (evtcount) is outputted from the configuration register unit 27.

The output selector 23 selects one of the above-mentioned plural data. The output data onto the transfer bus 22 selected by the output selector 23 is selected by the control signal slct [2:0] generated by the output selector selection logic 24. The data is transferred through the transfer bus 22 from the bytecode accelerator 5 to the register file 14 to be written in the register file 14.

To the contrary, when the bytecode accelerator 5 is started, plural data is transferred from the register file 14 to the bytecode accelerator 5. The data transferred to the bytecode accelerator 5 contains internal status information and event count information. Since data in the register file is outputted onto the transfer bus 22 one by one, inputs of flip-flops in the internal status unit 26 and the configuration register unit 27 may be controlled at proper timing by means of the input selection logic 28 to store data outputted onto the transfer bus therein. The flip-flops constitute memory stages of the internal status unit 26 and the configuration register unit 27.

As described above, when the bytecode accelerator 5 is started and ended, the plural data containing the internal information can be transferred between the bytecode accelerator 5 and the register file 14 of the CPU 4.

Figures 2, 3:
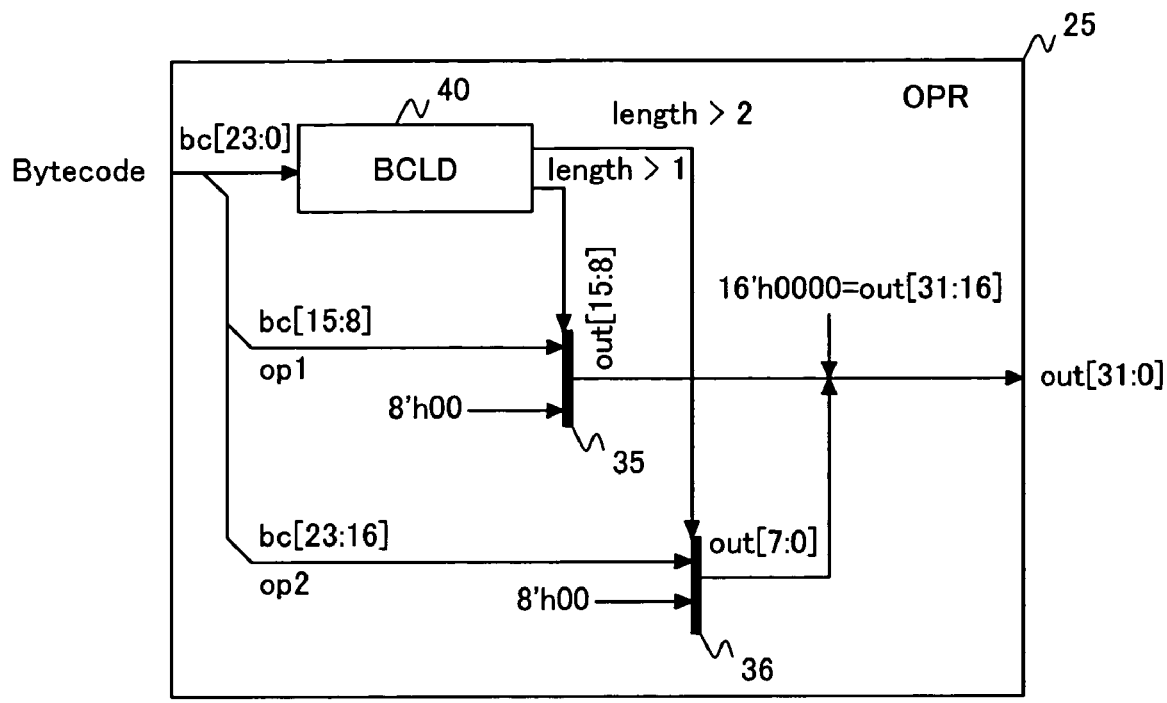
FIG. 2 is a block diagram schematically illustrating a detailed example of an operand output unit.
FIG. 3 shows bytecodes inputted to the operand output unit and aligned outputs of the bytecodes.

FIG. 2 illustrates a detailed configuration example of the operand output unit 25 and FIG. 3 shows the bytecodes inputted to the operand output unit 25 and aligned outputs of the bytecodes.

The operand output unit 25 is supplied with bytecodes and arranges or aligns the bytecodes to be outputted. The bytecode has an operation code set at the head thereof and operands set subsequent thereto. For example, bytecodes iadd, bipush and iinc have bytecode lengths of 1, 2 and 3 and the number of operands of 0, 1 and 2, respectively. The operands are named op1 and op2 in order. The operand output unit 25 includes a bytecode length decision unit (BCLD) 40, which decodes the bytecodes to examine the bytecode length thereof and then aligns the operands in accordance with the bytecode length to decide the output out [31:0]. The alignment or zero output of the operand is realized using selectors 35 and 36. For example, since the bytecode iadd has the bytecode length of 1, it is zero output. Since the bytecode bipush has the bytecode length of 2, higher order 16 bits are zero and next 8 bits are op1, lower order 8 bits being zero. For the bytecode iinc, upper order 16 bits and next 16 bits are op1 and op2. Since the operand is aligned, an instruction for aligning the operand is not required in the processing of the software virtual machine.

Figures 4, 5:
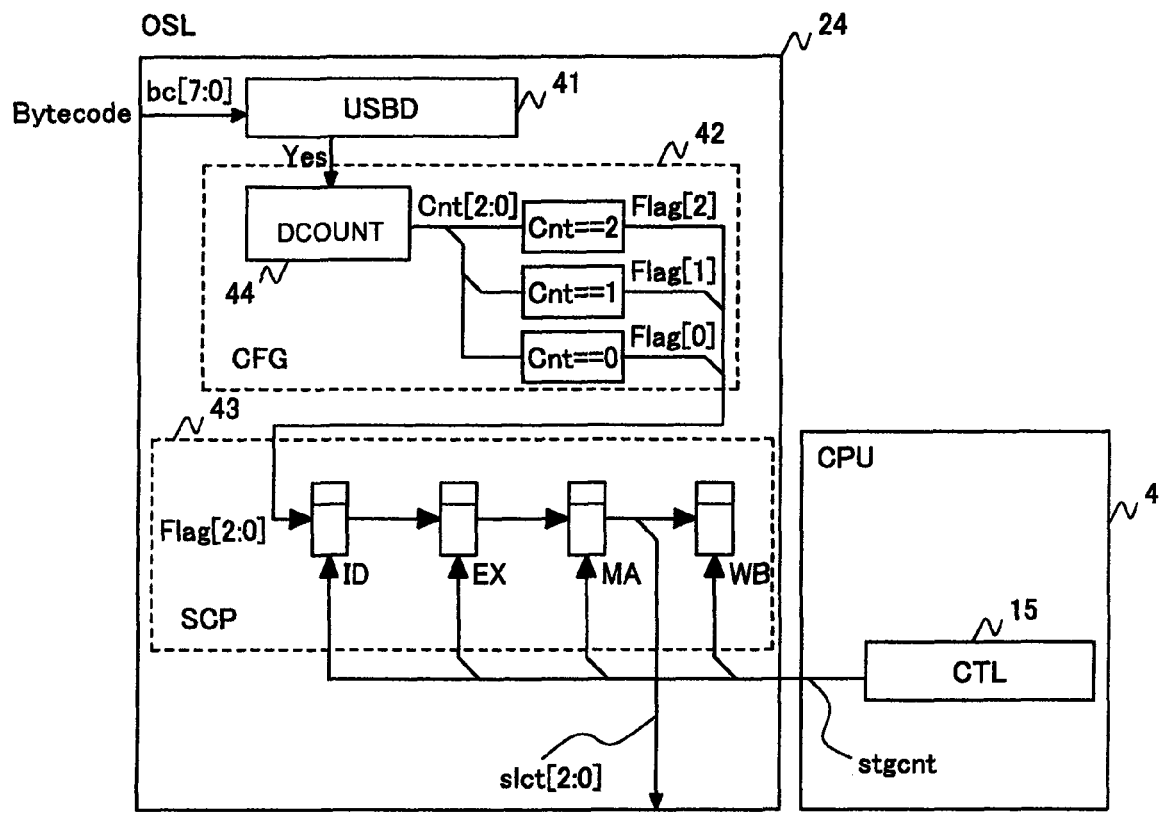
FIG. 4 is a block diagram schematically illustrating a detailed example of an output selector selection logic.
FIG. 5 shows 5 CPU instructions outputted to a CPU in order that a bytecode accelerator switches processing from hardware processing to software virtual machine.

FIG. 4 illustrates a detailed example of the output selector selection logic 24. The output selector selection logic 24 is supplied with the bytecodes and a stage control signal stgcnt from the CPU 4 and produces a selector signal Slct [2:0] for the output selector 23. The output selector selection logic 24 includes an unsupported bytecode decision logic unit (USBD) 41, a counter and flag generation unit (CFLG) 42 and a simulated CPU pipeline unit (SCP) 43.

The unsupported bytecode decision logic unit 41 is supplied with a bytecode bc[7:0] and decides whether the bytecode is executed by the bytecode accelerator 5 or not. When the bytecode accelerator 5 does not execute the bytecode, the unsupported bytecode decision logic unit 41 sends a signal of Yes to the counter and flag generation unit 42. The counter and flag generation unit 42 includes a down counter (DCOUNT)44 and generates flag information Flag[2:0] from a count of the down counter 44. When its count Cnt is 2 (Cnt==2), the flag information Flag[2] is logic value 1 and when its count Cnt is 1 (Cnt==1), the flag information Flag[1] is logic value 1. When its count Cnt is 0 (Cnt==0), the flag information Flag [0] is logic value 1. In the unsupported bytecodes, in order that the bytecode accelerator 5 switches processing from hardware processing to software virtual machine, the bytecode accelerator 5 produces 5 CPU instructions to the CPU 4. The 5 CPU instructions are exemplified in FIG. 5. First two instructions are a load instruction of a branch address to the software virtual machine and a branch instruction. Remaining 3 instructions are a register write instruction for an operand, a register write instruction for internal status of the bytecode accelerator 5 and a register write instruction for the event count register in order of description in FIG. 5. These instructions are translated by the bytecode translation logic unit 21. The bytecode translation logic unit 21 includes a down counter in order to translate the instructions in order. Numerical values described next to the line of instructions in FIG. 5 represent corresponding counts of the down counter. The counter and flag generation unit 42 includes a down counter identical with that of the bytecode translation logic unit 21 and grasps the execution statuses of the 5 instructions of FIG. 5 when the bytecodes are unsupported bytecodes. Here, the output selector selection logic 24 may share the down counter with the bytecode translation logic unit 21 and the output selector selection logic 24 may use a counter signal of the counter as its input. Since the counts corresponds to the instructions in one-to-one manner, the counts of the counter can be decoded to thereby understand execution of instructions for writing information from the bytecode accelerator 5 in the register file 14. The instructions for the counts Cnt of 2, 1 and 0 are instructions for writing internal information from the bytecode accelerator 5 in the register file 14. Accordingly, execution of the instructions can be grasped from the flag information Flag[2:0]. At this time, when Flag[2] is 1, the operand (oprd) is outputted (Operand Output) and when Flag [1] is 1, the internal status (stctl) is outputted (Statectl Output). When Flag[0] is 1, the event counter (evtcount) is outputted (Event Counter Output). Next, the timing that data is actually outputted to the transfer bus 22 by means of the simulated CPU pipeline unit 43 is grasped exactly. Here, the instruction for writing information from the bytecode accelerator 5 in the register file 14 is to write a value on the bus 22 at the MA (memory access) stage in the register file 14. At this time, the bytecode accelerator 5 must output the value onto the bus 22 correctly when the information Flag[2:0] reaches the MA stage. The simulated CPU pipeline unit 43 can be used to understand the timing that the value is outputted onto the bus 22. The controller 15 of the CPU 4 supplies the stage control signal stgcnt (Stage Control) in internal pipeline of the CPU to the bytecode accelerator 5. The simulated CPU pipeline unit 43 of the bytecode accelerator 5 uses the stage control signal to reproduce the same pipeline as that of the CPU 4. Here, it is supposed that there are a decode stage 1D, an execution stage EX, a memory access stage MA and a write back stage WB. In STC instruction, since the CPU 4 reads the bus 22 at the MA stage, the OSL 24 of the byte accelerator 5 decides the selector signal slct[2:0] so that the internal information can be outputted onto the bus 22 in synchronism with the CPU 4 when the flag information Flag [2:0] reaches the MA stage.

Figures 6, 7:
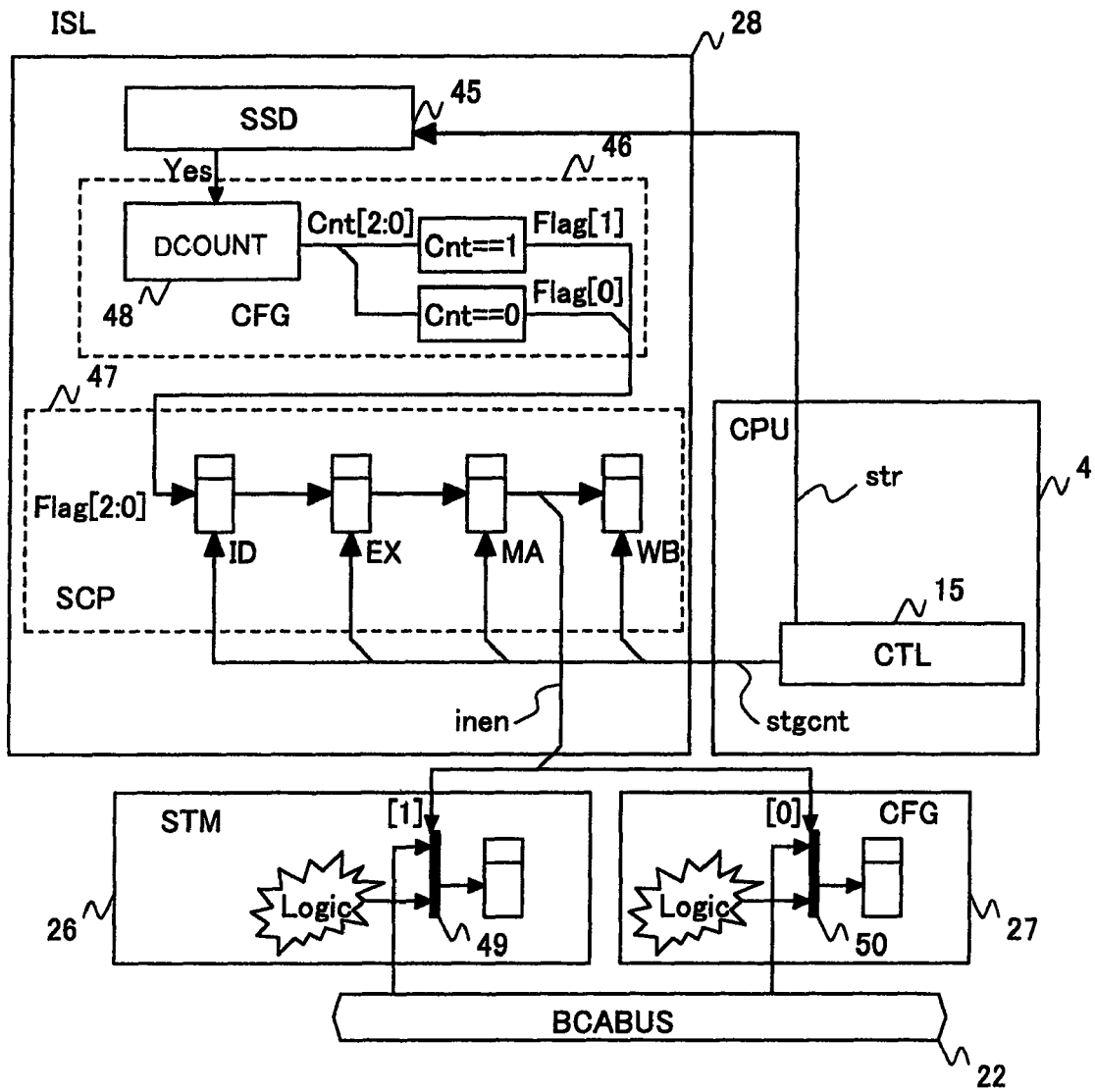
FIG. 6 is a block diagram schematically illustrating a detailed example of an input selection logic (ISL)
FIG. 7 shows 3 CPU instructions that the bytecode accelerator 5 outputs to the CPU when the bytecode accelerator 5 is started.

FIG. 6 illustrates a detailed example of the input selection logic (ISL) 28. The input selection logic 28 is supplied with a start signal str and a stage control signal stgcnt from the CPU 4 and produces an input control signal inen[1:0] for flip-flops of the internal status unit (STM) 26 and the configuration register unit (CFG) 27. The input selection logic 28 includes a start signal decision unit (SSD) 45, a counter and flag generation unit (CFLG) 46 and a simulated CPU pipeline unit (SCP) 47. First, the start signal decision unit 45 examines the start signal of the bytecode accelerator 5 from the CPU 4 and decides whether the bytecode accelerator 5 is started by the start signal (str) or not. When the bytecode accelerator 5 is started, the start signal decision unit 45 sends a signal of Yes to the counter and flag generation unit 46. The counter and flag generation unit 46 includes a down counter (DCOUNT) 48 and generates flag information Flag[1:0] from a count Cnt[2:0] of the down counter. When the count Cnt is 1 (Cnt=1), the flag information Flag[1] is set to logic 1 and when the count Cnt is 0 (Cnt=0), the flag information Flag [0] is set to logic 1. When the bytecode accelerator 5 is started, the bytecoder accelerator 5 sends three CPU instructions exemplified in FIG. 7 to the CPU 4. The first instruction is a branch instruction to Java program. Remaining two instructions are a write instruction (Statectl Input) for writing information from the general register of the CPU 4 into the internal status unit 26 of the bytecode accelerator 5 and a write instruction (Event Counter Input) for writing information from the general register file 14 of the CPU 4 into the event count register unit 27 in order of description in FIG. 7. The instructions are translated by the bytecode translation logic unit (TRS) 21. The bytecode translation logic unit 21 includes a down counter in order to translate instructions in order. Numerical values described next to the line of instructions in FIG. 7 represent counts of the down counter. The counter and flag generation unit 42 includes a down counter identical with that of the bytecode translation logic unit 21 and grasps the three instructions of FIG. 7 at the time of start. Here, the down counter 48 may be shared with the bytecode translation logic unit (TRS) 21 and the input selection logic (ISL) 28 may use the count signal thereof as its input. Since the counts corresponds to the instructions in one-to-one manner, the counts of the down counter can be decoded to thereby understand the execution status of instructions for writing information from the register file 14 of the CPU 4 to the bytecode accelerator 5. Hereupon, the instructions at the time when the counts Cnt are 1 and 0 are instructions for writing information from the register file 14 to the bytecode accelerator 5. Accordingly, the instructions are grasped using flag information Flag[1:0]. When the count Cnt is 1, Flag[1] is set to logic value 1 and at this time writing operation in the internal status unit 26 is made. When the count Cnt is 0, Flag[0] is set to logic value 1 and at this time writing operation in the event counter unit 27 is made. The simulated CPU pipeline unit 47 is used to transfer data in cooperation with the CPU 4. The timing that data in the register file 14 is actually outputted onto the transfer bus 22 is grasped exactly. Here, the value or data on the bus 22 at the MA stage is written in the flip-flops of the internal status unit (STM) 26 and the configuration register (CFG) 27 of the bytecode accelerator 5. At this time, the bytecode accelerator 5 must take in the value or data on the bus 22 exactly when the flag information Flag[2:0] reaches the MA stage. The simulated CPU pipeline unit 47 can be used to exactly understand the timing that data is loaded onto the bus 22. The stage control signal stgcnt in the internal pipeline of the CPU 4 is sent from the controller 15 of the CPU 4 to the bytecode accelerator 5. The simulated CPU pipeline unit 47 of the bytecode accelerator 5 reproduces the same pipeline as that of the CPU 4 using the stage control signal stgcnt. Here, there are a decode stage 1D, an execution stage EX, a memory access stage MA and a write back stage WB. In LDC instruction, since the CPU 4 loads data in the register file 14 onto the bus 22 at the MA stage, the bytecode accelerator 5 decides a value of the input enable signal inen in order when the flag information Flag[1:0] reaches the MA stage, so that correct internal information can be written in the bytecode accelerator 5 in synchronism with the CPU 4.

Figure 8:
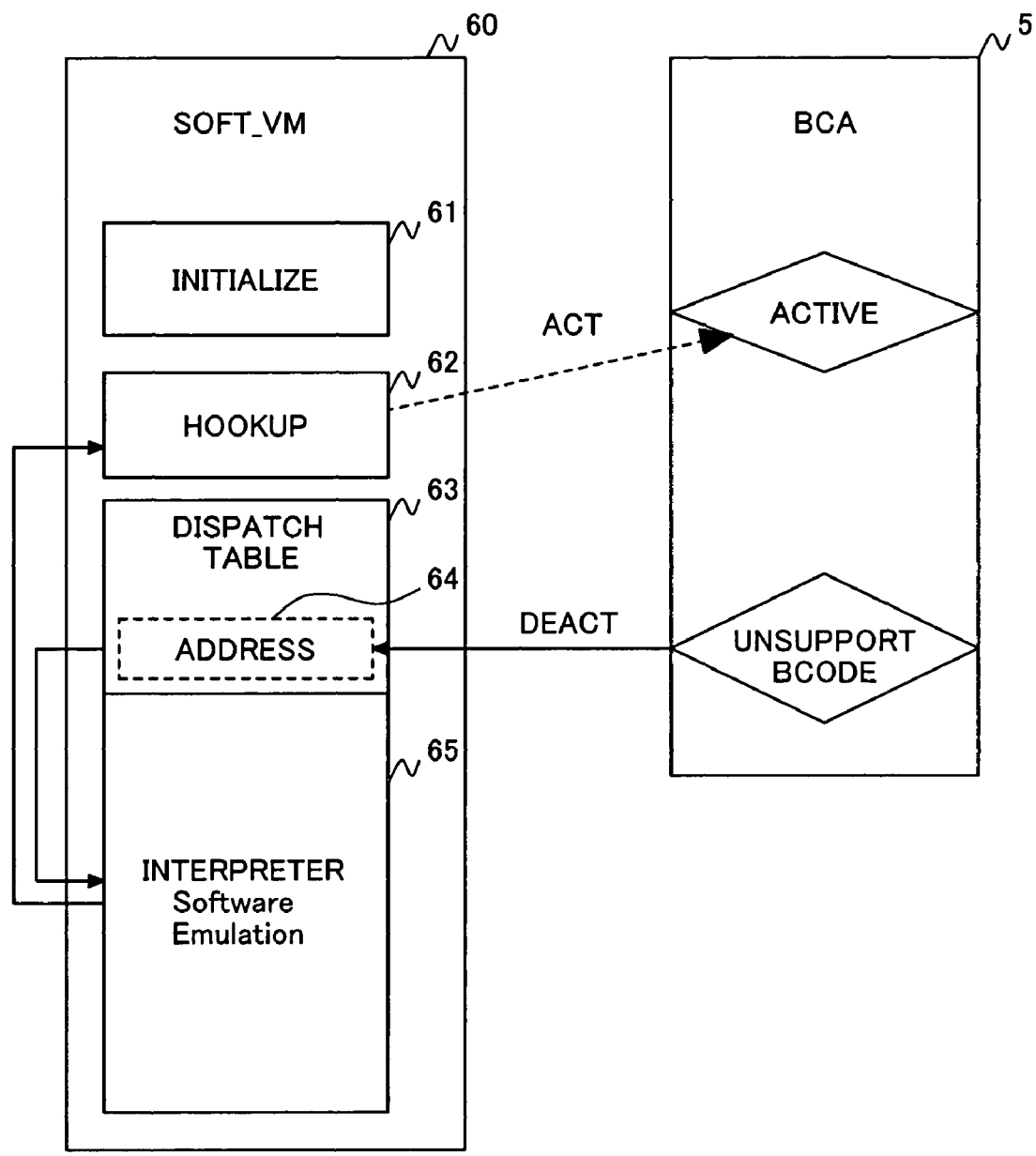
FIG. 8 illustrates allotted operation and mutual transition status of the bytecode accelerator (BCA) 5 and the software virtual machine (SOFT_VM) at the time that unsupported bytecodes which are not executed by hardware are executed.

Next, cooperation of the bytecode accelerator 5 and the software virtual machine is described. The bytecode accelerator 5 executes the bytecodes on hardware and cooperates with mounted part made up of other software to constitute the virtual machine. The mounted part made up of the software constitutes the software virtual machine (SOFT_VM). FIG. 8 illustrates allotted operation and mutual transition status of the bytecode accelerator (BCA) 5 and the software virtual machine (SOFT_VM) at the time of execution of the unsupported bytecodes which are not executed by hardware.

The software virtual machine (SOFT_VM) 60 includes an initialization part or routine (INIT) 61 for initializing execution of the software virtual machine, a hookup routine (HOOKUP) 62 in which a start instruction at the time that the bytecode accelerator 5 is started is set, a dispatch table (DISP_TBL) 63 indicating processing start addresses of the bytecodes in order to make interpretation and execution of the bytecodes by software, an address (ADDR) 64 in the dispatch table in which an interpreter start address of the bytecodes is set and an interpreter (INTPRET) 65 for interpreting and executing the bytecodes by software. The program of the software virtual machine is stored in the instruction cache memory 2 or the external memory 34. The software virtual machine program includes a hookup processing routine (HOOKUP) 62 for starting the bytecode accelerator 5. The CPU 4 executes the hookup processing routine 62 to thereby set the bytecode accelerator 5 to an activable status (ACTV). When the bytecode is an unsupported bytecode (USP_B-CODE) which is not executed by hardware, processing branches to the software virtual machine, that is, the software virtual machine program. When the bytecode is the unsupported bytecode, a processing address (ADDR) of the interpreter 64 is given from the relevant bytecode in the dispatch table (DISP_TBL) 63 and interpretation and execution are made by the interpreter (INTPRET) 65. The dispatch table 63 contains 256 arrays corresponding to the number of 8-bit bytecodes. After the bytecodes are interpreted and executed by the interpreter 65, processing branches to the hookup routine (HOOKUP) again, so that the bytecode accelerator 5 is started and the bytecode processing is continued.

Figure 9:
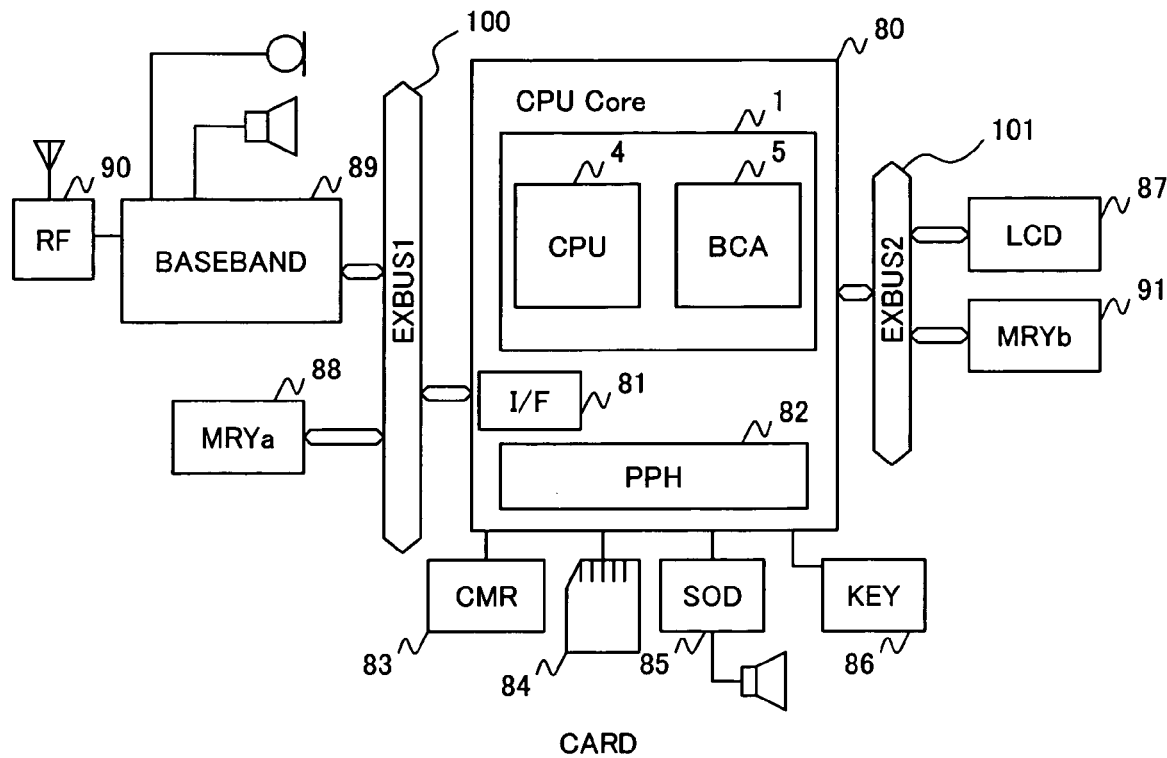
FIG. 9 is a block diagram illustrating an example of a portable telephone system that is a preferred application example of a microprocessor.

FIG. 9 illustrates an example of a portable telephone system as a preferred application example of the microprocessor 1. The portable telephone system includes, broadly divided, a communication portion and an application portion. The communication portion includes a high frequency unit (RF) 90 for transmitting and receiving electric wave through an antenna, a baseband processor (BBP) 89 having a modem for baseband and a codec and a memory (MRYa) 88. The application portion includes, as its main component, the microprocessor 1 having the bytecode accelerator (BCA) 5 and the central processing unit (CPU) 4 as described above. The microprocessor 1 is connected to the baseband processor 89 through an interface (I/F) 81 and an external bus (EXBUS1) 100 and also connected through a peripheral interface (PPH) 82 to a camera (CMR) 83, a memory card (CARD) 84, a sound source (SOD) 85 and a keyboard (KEY) 86. Further, the microprocessor 1 is connected through an external bus (EXBUS2) 101 to a liquid crystal display (LCD) 87 and a memory (MRYb) 91. In this example, the microprocessor 1 of the present invention is applied to the portable telephone system, although it may be applied to various systems such as portable information terminals and digital cameras.

Processing of the bytecodes can be made by this system at high speed and accordingly the value added of the portable information system can be enhanced.

Figure 10:
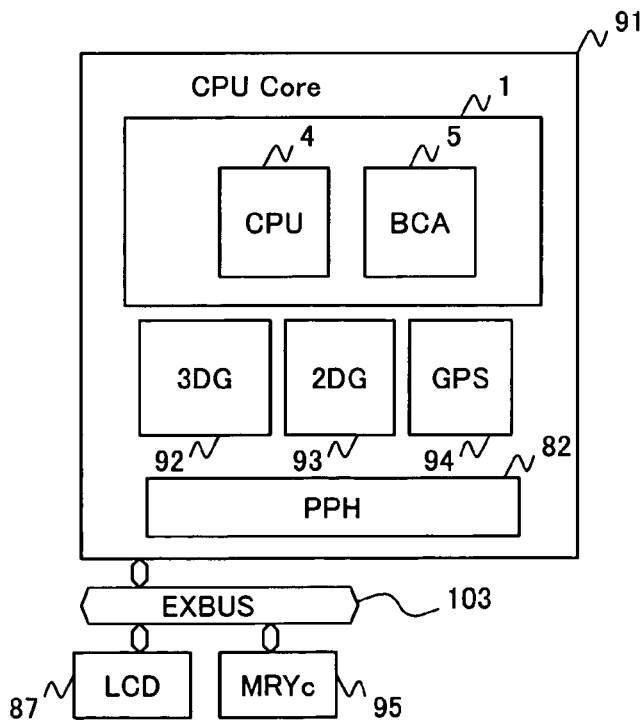
FIG. 10 is a block diagram illustrating a configuration of a vehicle information system such as, for example, a car navigation system that is a preferred application example of the microprocessor.

FIG. 10 illustrates an example of a vehicle information system such as, for example, a car navigation system as a preferred application example of the microprocessor 1. The microprocessor 1 provided with the central processing unit (CPU) 4 and the bytecode accelerator (BCA) 5 is integrated with a three-dimensional graphic accelerator (3DG) 92, a two-dimensional graphic accelerator (2DG) 93, a global positioning system (GPS) 94 and a peripheral interface (PPH) 82. Further, the system is connected through an external bus (EXBUS) 103 to a liquid crystal display (LCD) 87 and a memory (MRYc) 95.

In this system configuration example, Java application and software virtual machine 60 are stored in the memory (MRYc) 95. The interpreter 65 of the software virtual machine 60 is preferably disposed in an on-chip memory of the microprocessor made of semiconductor integrated circuit since the access frequency thereof is high. Processing of the bytecodes can be made by this system at high speed and accordingly the value added of the vehicle information system can be enhanced.

According to the embodiment of the present invention, following effects can be attained.

In transition between the hardware processing by the bytecode accelerator (BCA) for translating the stack-based intermediate language (bytecodes) into the register-based CPU instructions and the software processing by the software virtual machine, when the bytecode accelerator 5 is started, the plural pieces of internal information can be transferred from the register file 14 of the CPU 4 to the bytecode accelerator 5 by means of the internal transfer bus 22 between the bytecode accelerator 5 and the CPU 4 and the input selection logic (ISL) 28 and when the bytecode accelerator 5 ends its operation, the plural pieces of internal information in the bytecode accelerator 5 can be transferred to the register file 14 of the CPU 4 by means of the internal transfer bus 22 and the output selector 23 and the output selector selection logic 24 of the bytecode accelerator. Consequently, information sharing by hardware and software can be made at high speed and information processing in the data processing apparatus can be attained at high speed.

Further, by expanding the present invention, the data processing apparatus including the accelerator which can translate the virtual machine instructions into the native instructions and causes a main processor to execute the instructions and a coprocessor which receives coprocessor instructions from the main processor to be operated can improve the execution efficiency of the virtual machine instructions. In other words, registers of the coprocessor such as a floating point arithmetic unit (FPU) can be utilized while supposing that the registers are temporary registers, so that management of operand stacks to the main processor having the CPU and the coprocessor such as FPU can be simplified.

Since unsupported data for operation can be detected directly, arithmetic operation untreatable by the coprocessor such as FPU can be detected exactly.

Since unsupported data for operation can be detected directly to suppress its operation, an existing exceptional handler can be used even for transition to the software processing for the arithmetic operation untreatable by the coprocessor such as FPU without modifying the exceptional handler.

The invention made by the inventor has been described concretely on the basis of the embodiment, although it needless to say that the invention is not limited thereto and various modifications may be made by those skilled in the art without departing from the spirit and scope of the invention.

For example, transfer between the bytecode accelerator (BCA) and the register file can be performed even upon transition between other hardware processing and software processing without limited to the unsupported bytecodes. It contains, for example, CPU exceptional processing for performing TLB miss and interruption processing and Java exceptional processing detected by Java upon execution. The Java exceptional processing is exception defined in language stipulation by Java and effective upon execution such as null pointer exception, array index out of bounds exception and arithmetic exception for division of integer zero. Further, the execution environment containing the bytecodes and the interpreter is not limited to Java.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processor comprising:
   a register file including a plurality of registers;
   an instruction execution unit utilizing said register file to execute first format instructions as native instructions; and
   an instruction translation circuit for translating second format instructions into said first format instructions;
   wherein said information processor has, when a first program described in said second format instructions is executed, a first operation mode in which said first format instructions translated by said instruction translation circuit are executed and a second operation mode in which said first format instructions translated by translation software described in said first format instructions are executed;
   wherein said information processor comprises a dedicated bus for transferring data between said register file and said instruction translation circuit;
   wherein said instruction translation circuit includes an operand output unit aligning an operand included in the first program and outputs an output signal aligned by the operand output unit directly to said register file through said dedicated bus during a transition term from said first operation mode to said second operation mode,
   wherein said instruction translation circuit comprises a selection circuit that includes a simulated pipeline which simulates a pipeline of said instruction execution unit and generates timing that internal information is outputted onto said dedicated bus in synchronism with a predetermined pipeline stage in said simulated pipeline and timing that said internal information on said dedicated bus is taken in;
   wherein a bit length of the output signal is equal to a bit length of the dedicated bus, and
   wherein when the operand output unit aligns the operand in the first program, the operand output unit decides which part of the output signal is to be the operand in the first program based on a bytecode length of the first program.

2. An information processor according to claim 1, wherein said selection control circuit selectively outputs the operand aligned by said operand output unit or register management information for utilizing said plurality of registers as stacks onto said dedicated bus in response to execution of instructions by said instruction execution unit during said transition term from said operation mode onto said second operation mode.

3. An information processor according to claim 2, wherein said selection control circuit selectively outputs one of said operand aligned by said operand output unit, said register management information, or an event count information for switching events.

4. An information processor according to claim 3, wherein said selection control circuit includes a selector for selecting from said operand aligned by said operand output unit, said register management information, or an event count information for switching events to output onto said dedicated bus, an output selection logic circuit for controlling selection operation of said selector in response to execution of instructions by said instruction execution unit when the operation mode is switched from said first operation mode to said second operation mode.

5. An information processor according to claim 1, wherein when the operation mode is switched from said first operation mode to said second operation mode, said instruction translation circuit causes said instruction execution unit to execute a plurality of store instructions and said instruction translation circuit outputs said operand aligned by said operand output unit onto said dedicated bus in response to execution of said store instructions.

* * * * *